US009344679B2

(12) United States Patent
Uchiyama

(10) Patent No.: US 9,344,679 B2
(45) Date of Patent: May 17, 2016

(54) TRANSMISSION SYSTEM, TRANSMISSION TERMINAL AND METHOD OF TRANSMITTING PROGRAM

(71) Applicant: Hiroaki Uchiyama, Kanagawa (JP)

(72) Inventor: Hiroaki Uchiyama, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 9 days.

(21) Appl. No.: 14/301,832

(22) Filed: Jun. 11, 2014

(65) Prior Publication Data
US 2014/0375753 A1 Dec. 25, 2014

(30) Foreign Application Priority Data

Jun. 20, 2013 (JP) ................................ 2013-129852

(51) Int. Cl.
*H04N 7/14* (2006.01)
*H04M 1/24* (2006.01)
*H04N 7/15* (2006.01)
*G06F 21/34* (2013.01)
*H04M 3/56* (2006.01)
*G06F 21/12* (2013.01)

(52) U.S. Cl.
CPC .................. *H04N 7/15* (2013.01); *G06F 21/12* (2013.01); *G06F 21/34* (2013.01); *H04M 3/56* (2013.01); *G06F 2221/2101* (2013.01); *G06F 2221/2151* (2013.01)

(58) Field of Classification Search
CPC ..... H04N 7/15; H04N 17/004; H04N 17/045; H04N 1/0097
USPC ................ 348/14.01, 14.08, 14.12; 379/1.01, 379/9.02, 15.03, 26.01, 27.01
See application file for complete search history.

(56) References Cited

U.S. PATENT DOCUMENTS

| 7,020,249 B1* | 3/2006 | Haines ..................... H04M 3/30 379/1.01 |
| 2004/0187038 A1 | 9/2004 | Yachida |
| 2005/0177726 A1* | 8/2005 | Alasia et al. ................... 713/176 |
| 2010/0211945 A1* | 8/2010 | Doui ..................... G06F 21/121 717/176 |
| 2011/0267636 A1 | 11/2011 | Kamasuka |
| 2012/0026274 A1* | 2/2012 | Baker et al. ................. 348/14.01 |
| 2012/0268240 A1* | 10/2012 | Frerking .............. G05B 19/049 340/5.51 |

(Continued)

FOREIGN PATENT DOCUMENTS

| JP | 2004-303215 | 10/2004 |
| JP | 2011-233031 | 11/2011 |
| JP | 2014-057233 | 3/2014 |

*Primary Examiner* — Quoc D Tran
(74) *Attorney, Agent, or Firm* — Oblon, McClelland, Maier & Neustadt, L.L.P.

(57) ABSTRACT

A transmission terminal transmits content data to another transmission terminal via a network. A transmission management system processes a session among a plurality of the transmission terminals or for the single transmission terminal. The transmission terminal requests a user to input execution authentication information when an authentication medium is connected thereto. The authentication medium associates program identification information with the execution authentication information and stores them. The transmission terminal determines whether the execution information from the user is coincident with the stored one and transmits the associated program identification information to the transmission management system at a time of coincidence. The transmission management system then transmits a transmission instruction to the program providing apparatus to transmit the corresponding program to the transmission terminal.

10 Claims, 14 Drawing Sheets

(56) References Cited

U.S. PATENT DOCUMENTS

| | | | |
|---|---|---|---|
| 2013/0031365 A1* | 1/2013 | Park et al. | 713/164 |
| 2013/0321556 A1 | 12/2013 | Uchiyama | |
| 2014/0071225 A1 | 3/2014 | Uchiyama et al. | |
| 2014/0074932 A1 | 3/2014 | Mihara et al. | |
| 2014/0077937 A1 | 3/2014 | Kato et al. | |
| 2014/0101721 A1 | 4/2014 | Nagase et al. | |

* cited by examiner

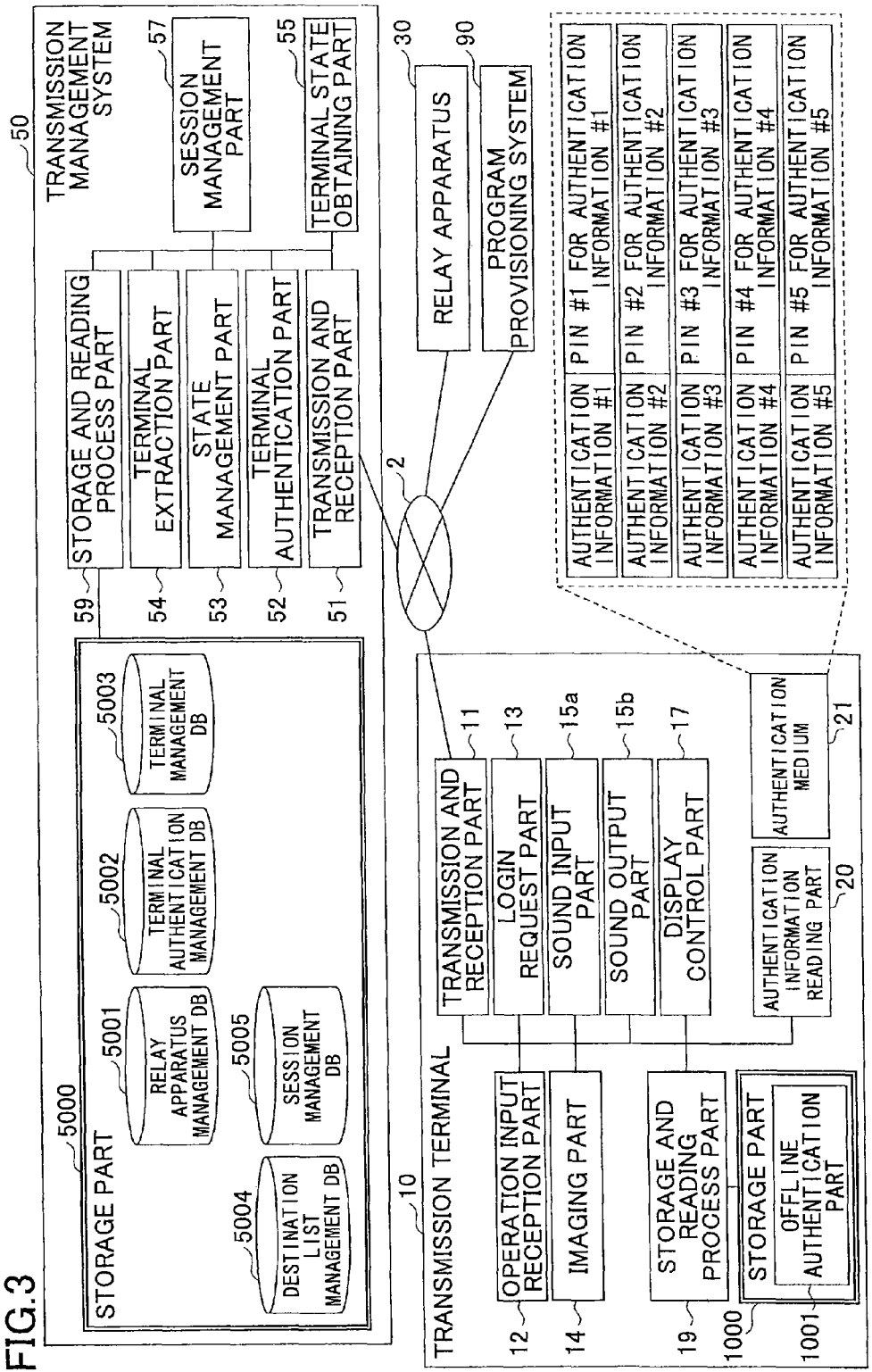

FIG.4

RELAY APPARATUS MANAGEMENT TABLE

| RELAY APPARATUS | OPERATION STATE | RECEIVED DATE AND TIME | IP ADDRESS OF RELAY APPARATUS | HIGHEST DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.5

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.6

TERMINAL MANAGEMENT TABLE

| TERMINAL ID | OPERATION STATE | RECEIVED DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.7

DESTINATION LIST MANAGEMENT TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.8

SESSION MANAGEMENT TABLE

| SELECTION SESSION ID | RELAY APPARATUS ID | REQUEST SOURCE TERMINAL ID | DESTINATION TERMINAL ID | DELAY TIME (ms) | DELAY INFORMATION RECEIVED DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

PROGRAM MANAGEMENT TABLE

| PROGRAM IDENTIFICATION INFORMATION | ADDRESS INFORMATION OF PROGRAM |
|---|---|
| MAINTENANCE #1 | C:¥Program¥Maintenance¥#1 |
| ... | ... |

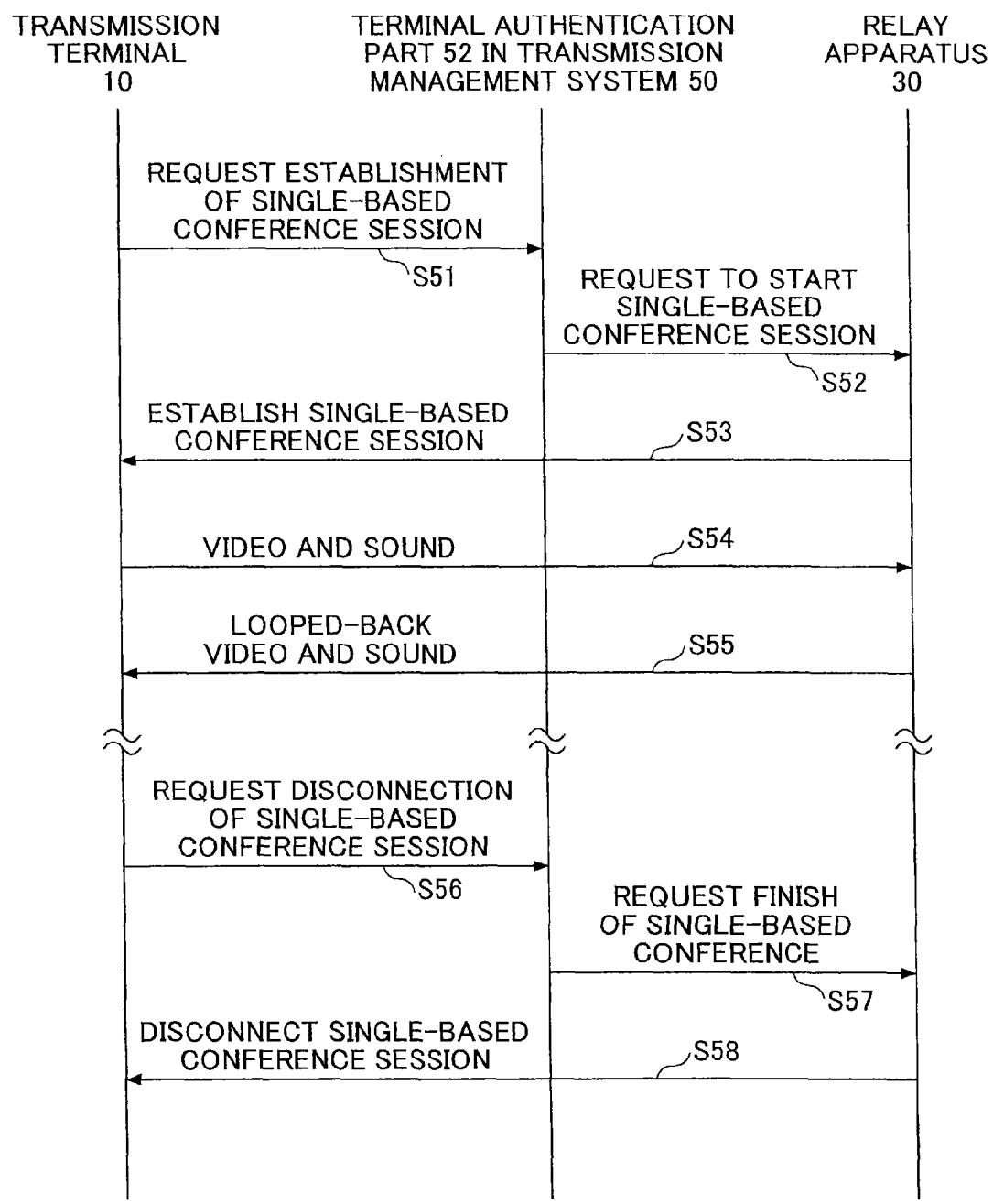

TRANSMISSION SYSTEM, TRANSMISSION TERMINAL AND METHOD OF TRANSMITTING PROGRAM

BACKGROUND OF THE INVENTION

1. Field of the Invention

The present invention relates to a transmission system, a transmission terminal and a method of transmitting a program.

2. Description of the Related Art

A remote conference system is known as one style of a transmission system connected with a network.

In such a remote conference system, a video distribution server distributes video data and sound data to respective transmission terminals.

SUMMARY OF THE INVENTION

According to one aspect of the present invention, a transmission system includes a transmission terminal that transmits content data to another transmission terminal via a network; a transmission management system that processes a session among a plurality of the transmission terminals or for the single transmission terminal and includes one or more information processing apparatuses; and a program providing apparatus that transmits a program to the transmission terminal. The transmission terminal includes an input request part that requests a user to input execution authentication information when an authentication medium is connected with the transmission terminal. The authentication medium includes a storage part that associates program identification information for identifying a program with the execution authentication information requested when the program is to be executed and stores them. The transmission terminal further includes an execution authentication information determination part that determines whether the execution authentication information that is input by the user is coincident with the execution authentication information stored in the storage part and a first transmission part that, when it is determined that the execution authentication information that is input by the user is coincident with the execution authentication information stored in the storage part, transmits the program identification information associated with the execution authentication information to the transmission management system. The transmission management system includes a second transmission part that transmits a transmission instruction to the program providing apparatus. The transmission instruction requests the program providing apparatus to transmit the program corresponding to the program identification information received from the transmission terminal to the transmission terminal. The program providing apparatus includes a third transmission part that, when receiving the transmission instruction, transmits the program corresponding to the program identification information received from the transmission management system to the transmission terminal.

Other objects, features and advantages of the present invention will become more apparent from the following detailed description when read in conjunction with the accompanying drawings.

BRIEF DESCRIPTION OF THE DRAWINGS

FIG. 3 shows a functional configuration example of main apparatuses;

FIG. 4 shows a conceptual diagram of a relay apparatus management table;

FIG. 5 shows a conceptual diagram of a terminal authentication management table;

FIG. 6 shows a conceptual diagram of a terminal management table;

FIG. 7 shows a conceptual diagram of a destination management table;

FIG. 8 shows a conceptual diagram of a session management table;

FIG. 18 is sequence diagram showing a process example of establishing a session for a self-diagnostic process and looping video and sound back.

DETAILED DESCRIPTION OF THE EMBODIMENTS

Below, using the drawings, the embodiment of the present invention will be described in detail.

<Configuration>

Figure 1:
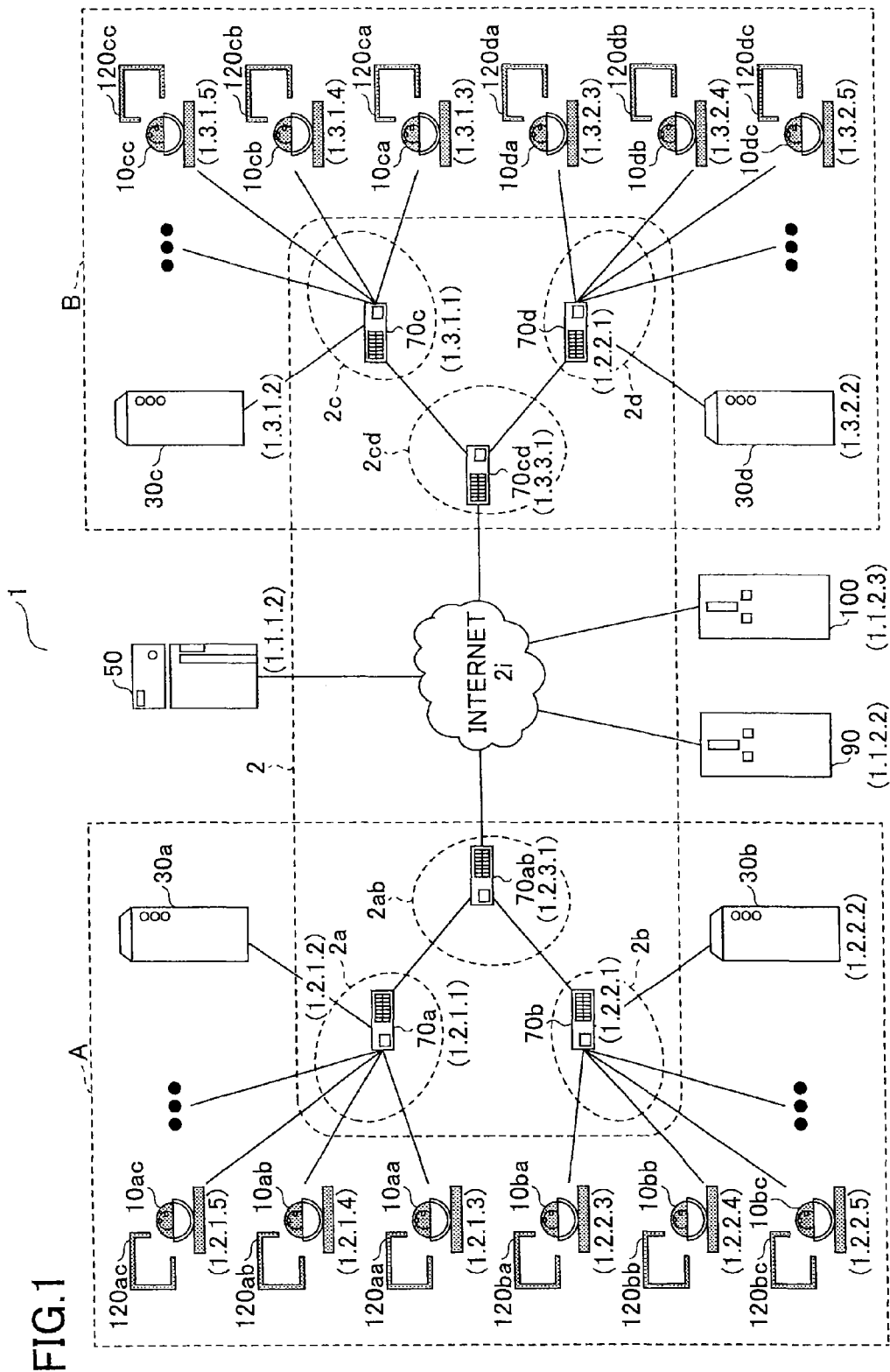
FIG. 1 shows a configuration example of a transmission system.

FIG. 1 shows a configuration example of a transmission system.

In FIG. 1, the transmission system 1 includes a plurality of transmission terminals 10aa, 10ab, . . . (generalized as those "10"), display devices 120aa, 120ab, . . . (generalized as those "130") for the respective transmission terminals 10, a plurality of relay apparatuses 30a, 30b, 30c and 30d (generalized as those "30"), a transmission management system 50, a program provisioning system 90 and a maintenance system 100.

The transmission system 1 can be, for example, a data providing system in which, via the transmission management system 50, content data is transmitted from one transmission terminal 10 to another transmission terminal 10 in one direction; or a communication system in which, via the transmission management system 50, information and/or feelings are transmitted among a plurality of transmission terminals 10. The communication system is a system in which a plurality of communication terminals (corresponding to the transmission terminals 10) transmit information and/or feelings thereamong via a communication management system (corresponding to the transmission management system 50). A TV conference system, a TV telephone system, a voice conference system, a voice telephone system, a Personal Computer (PC) screen sharing system and so forth can be cited as examples of such a communication system.

Concerning the present embodiment, the transmission system 1, the transmission management system 50 and the transmission terminals 10 will be described assuming a TV conference system as one example of the communication system, assuming a TV conference management system as one example of a communication management system and assuming TV conference terminals as one example of communication terminals. In other words, the transmission terminals 10 and the transmission management system 50 according to the present invention can be applied not only to a TV conference system but also to a communication system or a transmission system.

The transmission terminal 10 transmits and receives image data and sound data as one example of content data. Note that it is also possible that instead of transmitting and receiving image data but the transmission terminal 10 transmits and receives sound data. Note that although a case will be described where image data is data of a moving picture, image data cannot only be a moving picture but also be a static picture. Further, image data can include data of a moving picture and a data of a static picture.

The relay apparatus 30 relays image data and sound data among a plurality of transmission terminals 10. The transmission management system 50 manages the transmission terminals 10 and the relay apparatuses 30 unitarily.

The transmission system 1 can transmit and receive video data by using a video coding standard such as H.264/Scalable Video Coding (SVC). Further, a transmission management session is established through the transmission management system 50 for transmitting and receiving various sorts of management information. Then, video data and sound data are transmitted and received among the respective transmission terminal 10 via the relay apparatus(es). As a video coding standard, any of the known standards can be used, and is not limited to H.264/SVC. For example, H.264/Advanced Video Coding (AVC) can be used instead.

The program provisioning system 90 includes a storage device such as a Hard Disk (HD) and stores therein a program for a terminal which causes the transmission terminal 10 to implement various functions (or causes the transmission terminal to function as various units). The program provisioning system 90 can transmit the program for a terminal to each transmission terminal 10. Further, the program provisioning system 90 also stores a program for a relay apparatus for causing the relay apparatus to implement various functions (or function as various units) and can transmits the program for a relay apparatus to each relay apparatus 30. Further, the program provisioning system 90 stores also a maintenance program for the transmission terminal 10 and can transmit the program to the transmission terminal 10.

Figure 2:
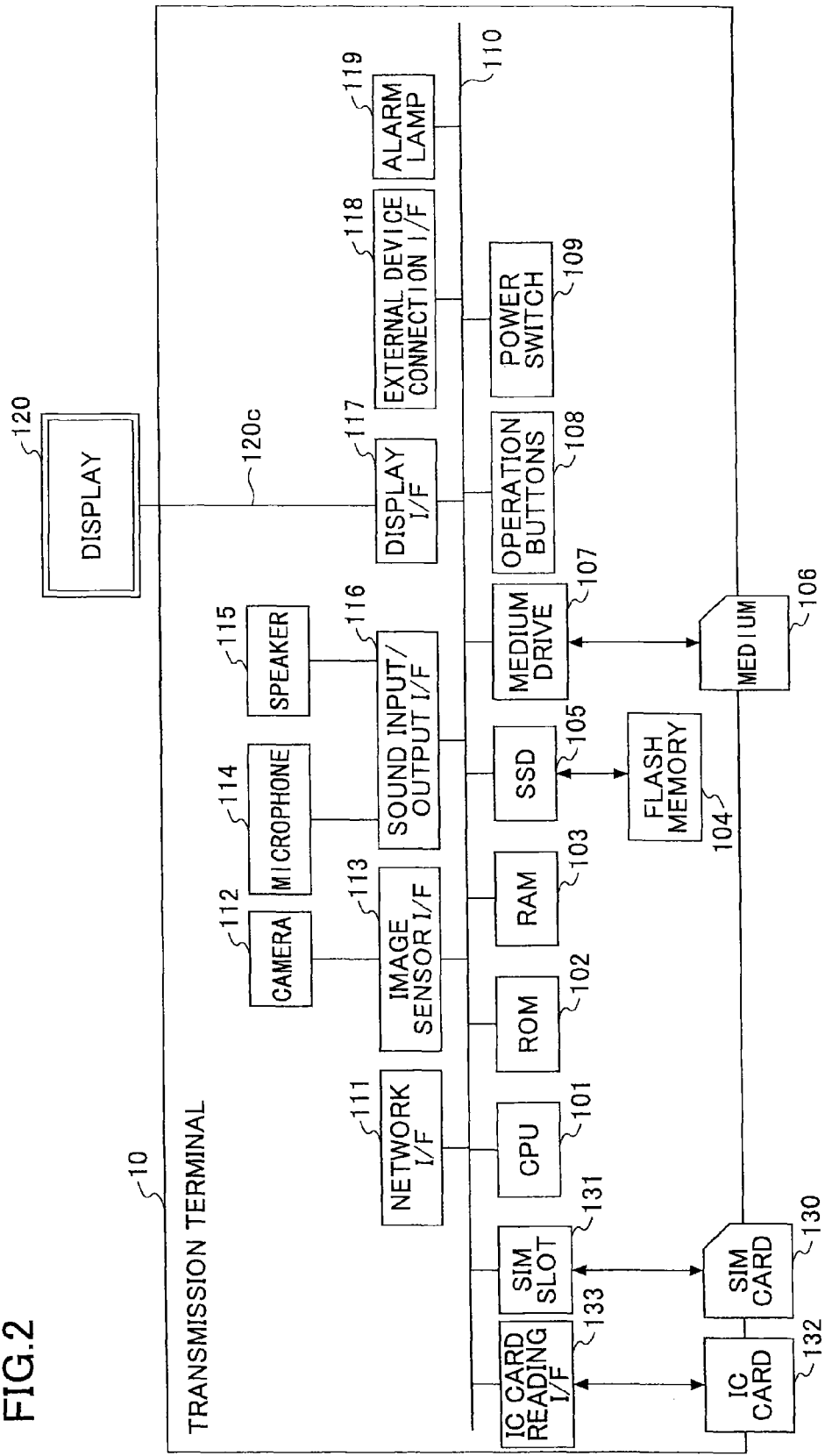
FIG. 2 shows a hardware configuration example of a transmission terminal.

FIG. 2 shows a hardware configuration example of the transmission terminal 10.

The transmission terminal 10 includes a Central Processing Unit (CPU) 101 that controls the entirety of the transmission terminal 10, a Read-Only Memory (ROM) 102 storing programs for driving the CPU 101 such as an Initial Program Loader (IPL), a Random Access Memory (RAM) 103 used as a work area for the CPU 101, a flash memory 104 storing various sorts of data such as the program for a terminal, video data and sound data and a Solid State Drive (SSD) 105 that controls, under the control of the CPU 101, reading and writing of various sorts of data on the flash memory 104.

Further, the transmission terminal 10 includes a medium drive 107 that controls reading and writing of data on a recording medium 106 such as a flash memory, a Subscriber Identity Module (SIM) slot 131 for accessing a SIM card 130 as the authentication medium that stores authentication information and so forth and an IC card reading InterFace (I/F) 133 for reading information from an IC card 132.

Further, the transmission terminal 10 includes operation buttons 108 operated by a user for selecting a destination of the transmission terminal 10, a power switch 109 for turning on and off the power in the transmission terminal 10 and a network I/F 111 for transmitting data by using a communication network 2.

Further, the transmission terminal 10 includes an built-in-type camera 112 that images a subject under the control of the CPU 101 and obtains video data, an image sensor I/F 113 that controls driving of the camera 112, a microphone 114 for inputting sound, a built-in-type speaker 115 outputting sound and a sound input/output I/F 116 processing operations of inputting and outputting a sound signal under the control of the CPU 101 between the microphone 114 and the speaker 115. The camera 112 includes a lens and a solid-state image sensor that converts light into electric charge and obtains electronic image data from a video image of a subject. As the solid-state image sensor, a Complementary Metal Oxide Semiconductor (CMOS) device, a Charge Coupled Device (CCD) or the like can be used.

The transmission terminal 10 further includes a display I/F 117 for transmitting video data to a display device 120 provided externally which is under the control of the CPU 101. The display device 120 includes a liquid crystal device or an organic ElectroLuminescense (EL) for displaying a video image of a subject, an operation icon and so forth. The display device 120 is connected to the display I/F 117 via a cable 120c. The cable 120c can be a cable for an analog RGB (VGA) signal, a cable for component video or a cable for a High-Definition Multimedia Interface (HDMI) (registered trademark) signal or a Digital Video Interactive (DVI) signal.

Further, the transmission terminal 10 includes an external device connection I/F 118 for connecting various external devices, an alarm lamp 119 indicating faults in various functions of the transmission terminal 10 and a bus line 110 such as an address bus, a data bus, and so forth for electrically connecting the above-mentioned respective elements. To the external device connection I/F 118, a camera to be provided externally, a microphone to be provided externally, a speaker to be provided externally or the like can be electrically connected via a Universal Serial Bus (USB) cable or the like. When a camera to be provided externally is connected, the camera to be provided externally is driven with priority to the built-in-type camera 112 under the control of the CPU 101. In the same way, when a microphone to be provided externally or a speaker to be provided externally is connected, a microphone to be provided externally or a speaker to be provided externally is driven with priority to the built-in-type microphone 114 or the built-in type speaker 115. To the external device connection I/F 118, a SD card or a USB memory can be connected.

Note that the transmission terminal 10 can be a PC, a smartphone, a tablet terminal or a cellular phone/portable phone. Further, the transmission terminal 10 needs not include the camera, microphone and speaker provided internally, and can only include the camera, microphone and speaker provided externally.

FIG. 3 shows a functional configuration example of main apparatuses.

In FIG. 3, the transmission terminal 10 includes a transmission and reception part 11, an operation input reception part 12, a login request part 13, an imaging part 14, a sound input part 15a, a sound output part 15b, a display control part 17, a storage and reading process part 19, an authentication information reading part 20 and a storage part 1000. The storage part 1000 includes an offline authentication part 1001.

The transmission and reception part 11 is implemented by the network I/F 111 shown in FIG. 2 and transmits and receives various sorts of data with another terminal, another apparatus or another system via the communication network 2.

The operation input reception part 12 is implemented by the operation buttons 108 and the power switch 109 shown in FIG. 2 and receives various inputs from a user.

The login request part 13 is implemented by the CPU 101 shown in FIG. 2 and transmits, in response to the power being turned on, login request information requesting login and the current IP address of the transmission terminal 10 (the request source terminal) from the transmission and reception part 11 to the transmission management system 50 via the communication network 2 automatically. Note that it is also possible that the login request information is transmitted in response to, other than the power being turned on, a corresponding input given by a user to the operation input reception part 12 of the transmission terminal 10.

The imaging part 14 is implemented by the camera 112 and the image sensor I/F 113 shown in FIG. 2, takes an image of a subject using the camera 112 and outputs video data thus taken by the camera 112.

The sound input part 15a is implemented by the microphone 114 and the sound input/output I/F 116 shown in FIG. 2. When the microphone 114 converts a user's voice into a sound signal, sound data of the sound signal is input.

The sound output part 15b is implemented by the sound input/output I/F 116 and the speaker 115 shown in FIG. 2. A sound signal of sound data is output to the speaker 115 which then outputs a corresponding sound.

The display control part 17 is implemented by the display I/F 117 shown in FIG. 2 and carries out control to transmit video data to the display device 120 provided externally.

The storage and reading process part 19 is implemented by the SSD 105 and so forth shown in FIG. 2, stores various sorts of data in the storage part 1000 including the flash memory 104 or reads various sorts of data stored in the storage part 1000.

The authentication information reading part 20 is implemented by the SIM slot 131, the IC card reading I/F 133, the external device connection I/F 118 and so forth shown in FIG. 2, and reads information from the authentication medium 21.

In the authentication medium 21, a plurality of sets of authentication information for the transmission terminal 10 to carry out authentication and Personal Identification Number (PIN) codes as execution authentication information to be used for authentication when the maintenance program corresponding to the set of authentication information is executed are stored. Accessing the authentication medium 21 is allowed only through the authentication information reading part 20. It is possible to start the respective maintenance programs corresponding to the plurality of sets of authentication information by using the plurality of sets of authentication information. The transmission terminal 10 uses information stored in the authentication medium 21 and requests, via the network, the transmission management system 50 to carry out authentication of the transmission terminal 10 and provide the corresponding maintenance program. The PIN codes are one example, and image information can be used instead.

The authentication information (the plurality of sets of authentication information) includes identification information and passwords indicating identification information of the transmission terminals managed by the transmission management system 50. Further, program identification information for identifying each maintenance program to be executed is also included. Note that, instead of the identification information of the transmission terminals, user identification information can be used. Note that if the authentication medium 21 is lost, it is possible to remotely invalidate the authentication medium 21 by deleting the corresponding authentication information from a terminal authentication management DataBase (DB) 5002 in the transmission management system 50.

The offline authentication part 1001 carries out terminal authentication using authentication information stored in the authentication medium 21 when the transmission terminal 10 is not connected to the communication network 2. When the transmission terminal 10 is connected with the communication network 2, the transmission terminal 10 uses information stored in the authentication medium 21 and carries out authentication of the transmission terminal 10 through the transmission management system 50 via the communication network 2. In this case, in the transmission management system 50, a terminal authentication part 52 described later uses a terminal authentication management DB 5002 to carry out terminal authentication. The offline authentication part 1001 has the same function as the terminal authentication part 52 in the transmission management system 50.

The transmission management system 50 includes a transmission and reception part 51, the terminal authentication part 52, a state management part 53, a terminal extraction part 54, a terminal state obtaining part 55, a session management part 57, a storage and reading process part 59 and a storage part 5000. In the storage part 5000, a relay apparatus management DB 5001, the terminal authentication management DB 5002, a terminal management DB 5003, a destination list management DB 5004 and a session management DB 5005 are provided.

(Relay Apparatus Management Table)

In the storage part 5000, the relay apparatus management DB 5001 is provided which provides a relay apparatus management table such as that shown in FIG. 4. The operation state of the relay apparatus, a received date and time when state information indicating the operation state is received by the transmission management system 50, the IP address of the relay apparatus and the highest data transmission rate (Mbps) in the relay apparatus are associated with each other and stored in the relay apparatus management table for the relay apparatus ID of each relay apparatus. For example, in the relay apparatus management table shown in FIG. 4, it is shown that the relay apparatus having the relay apparatus ID "111a" has the operation state "online", the transmission management system 50 received the state information at "13:00, Nov. 10, 2009", the IP address of the relay apparatus is "1.2.1.2" and the highest data transmission rate in the relay apparatus is 100 Mbps.

(Terminal Authentication Management Table)

Further, in the storage part 5000, the terminal authentication management DB 5002 is provided which includes a terminal authentication management table such as that shown in FIG. 5. In the terminal authentication management table, passwords are associated with the respective terminal IDs of all the transmission terminals 10 managed by the transmission management system 50 and are managed. For example, in the terminal authentication management table shown in FIG. 5, it is shown that the terminal ID of the transmission terminal 10aa is "01aa" and the password is "aaaa".

(Terminal Management Table)

Further, in the storage part 5000, the terminal management DB 5003 is provided which includes a terminal management table shown in FIG. 6. In the terminal management table, the operation state of the transmission terminal 10, a date and time when login request information described later is received by the transmission management system 50 and the IP address of the transmission terminal 10 are associated with the terminal ID of each transmission terminal 10 and are managed. For example, in the terminal management table shown in FIG. 6, it is shown that the transmission terminal 10aa having the terminal ID "01aa" has the operation state "online", the transmission management system 50 received the login request information at "13:40, Nov. 10, 2009" and the transmission terminal 10aa has the IP address "1.2.1.3".
(Destination List Management Table)

Further, in the storage part 5000, the destination list management DB 5004 is provided which includes a destination list management table shown in FIG. 7. In the destination list management table, the terminal IDs of all the transmission terminals registered as candidates for a destination terminal 10B are associated with the terminal ID of each of request source terminals 10A which requests a start of a TV conferences and are managed. For example, in the destination list management table shown in FIG. 7, it is shown that the candidates for a destination terminal 10B for which a start of a TV conference is requested by the request source terminal 10aa having the terminal ID "01aa" include three, i.e., the transmission terminal 10ab having the terminal ID "01ab", the transmission terminal 10ba having the terminal ID "01ba" and the transmission terminal 10db having the terminal ID "01db". The candidates for a destination terminal 10B are updated through an addition or a deletion by an addition or a deletion request from a request source terminal 10A to the transmission management system 50.
(Session Management Table)

Further, in the storage part 5000, the session management DB 5005 is provided which includes a session management table such as that shown in FIG. 8. In the session management table, the relay apparatus ID of the relay apparatus 30 to be used for relaying image data and sound data, the terminal ID of the request source terminal 10A, the terminal ID of the destination terminal 10B, a delay time (ms) for receiving image data at the destination terminal 10B and a date and time when delay information indicating the delay time transmitted by the destination terminal 10B is received by the transmission management system 50 are associated with each selection session ID to be used to carry out a session for selecting the relay apparatus 30 and are managed. For example, in the session management table shown in FIG. 8, it is shown that the relay apparatus 30a (the relay apparatus ID "111a") selected through a session carried out by using the selection session ID "sel" relays image data and sound data between the request source terminal 10aa having the terminal ID "01aa" and the destination terminal 10db having the terminal ID "01db" and the delay time of image data at a time of "14:00, Nov. 10, 2009" at the destination terminal 10db is 200 (ms). Note that when a TV conference is held between two transmission terminals 10, it is also possible to manage a date and time when the delay information is received based on the delay information transmitted not from the destination terminal 10B mentioned above but from the request source terminal 10A. However, when a TV conference is held among three or more transmission terminals 10, a date and time when the delay information is received is managed based on the delay information transmitted from the transmission terminal at the reception end of image data and sound data.

The transmission and reception part 51 transmits and receives various data (or information) to and from another transmission terminal or the transmission management system 50 via the communication network 2.

The terminal authentication part 52 carries out terminal authentication by searching the terminal authentication management DB 5002 in the storage part 5000 using, as search keys, the terminal ID and password included in login request information received through the transmission and reception part 51 and determining whether the same terminal ID and password are managed in the terminal authentication management table. Note that it is also possible to use a more complicated authentication method instead of the authentication method using a password.

In order to manage the operation state of the request source terminal which sends a login request, the state management part 53 associates the terminal ID of the request source terminal, the operation state of the request source terminal, a date and time when the transmission management system 50 receives the login request information and the IP address of the request source terminal with each other, stores them in the terminal management table of the terminal management DB 5003 and manages them.

The terminal extraction part 54 extracts the terminal ID by reading the terminal ID of the candidate for a destination terminal which can carry out a telephone call with the request source terminal by searching the destination list management table of the destination list management DB 5004 using, as a search key, the terminal ID of the request source terminal which sends the login request.

The terminal state obtaining part 55 reads the operation state of the terminal ID extracted by the terminal extraction part 54 by searching the terminal management table of the terminal management DB 5003 by using, as a search key, the terminal ID of the candidate for a destination terminal extracted by the terminal extraction part 54.

The session management part 57 associates the session ID, the terminal ID of the request source terminal and the terminal ID of the destination terminal with each other, stores them in the session management table of the session management DB 5005 and manages them.

The storage and reading process part 59 stores various data in the storage part 5000 and reads various data stored in the storage part 5000.

Figures 9, 10:
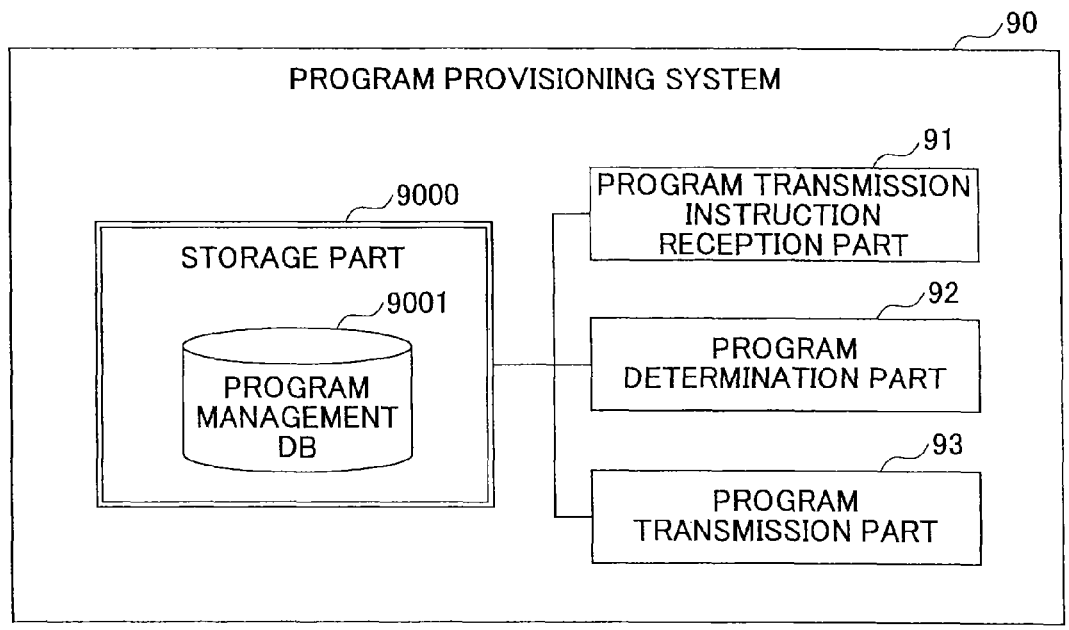
FIG. 9 shows a configuration example of a program provisioning system.
FIG. 10 shows a conceptual diagram of a program management table.

FIG. 9 shows a configuration example of the program provisioning system.

The program provisioning system 90 includes a program transmission instruction reception part 91, a program determination part 92, a program transmission part 93 and a storage part 9000. In the storage part 9000, a program management DB 9001 is stored.

The program management DB 9001 is a DB in which program identification information for identifying each program and address information at which the program is stored is associated with each other. FIG. 10 shows one example of the program management table included in the program management DB 9001.

Returning to FIG. 9, the program transmission instruction reception part 91 has a function of receiving a program transmission instruction from the transmission management system 50. The program determination part 92 has a function of determining the address information of the corresponding program from the program management DB 9001 based on the program identification information included in the received program transmission instruction. The program transmission part 93 has a function of transmitting the program obtained based on the determined address information of the program to the address information of the transmission terminal 10 included in the program transmission instruction.

<Operations>

Figure 11:
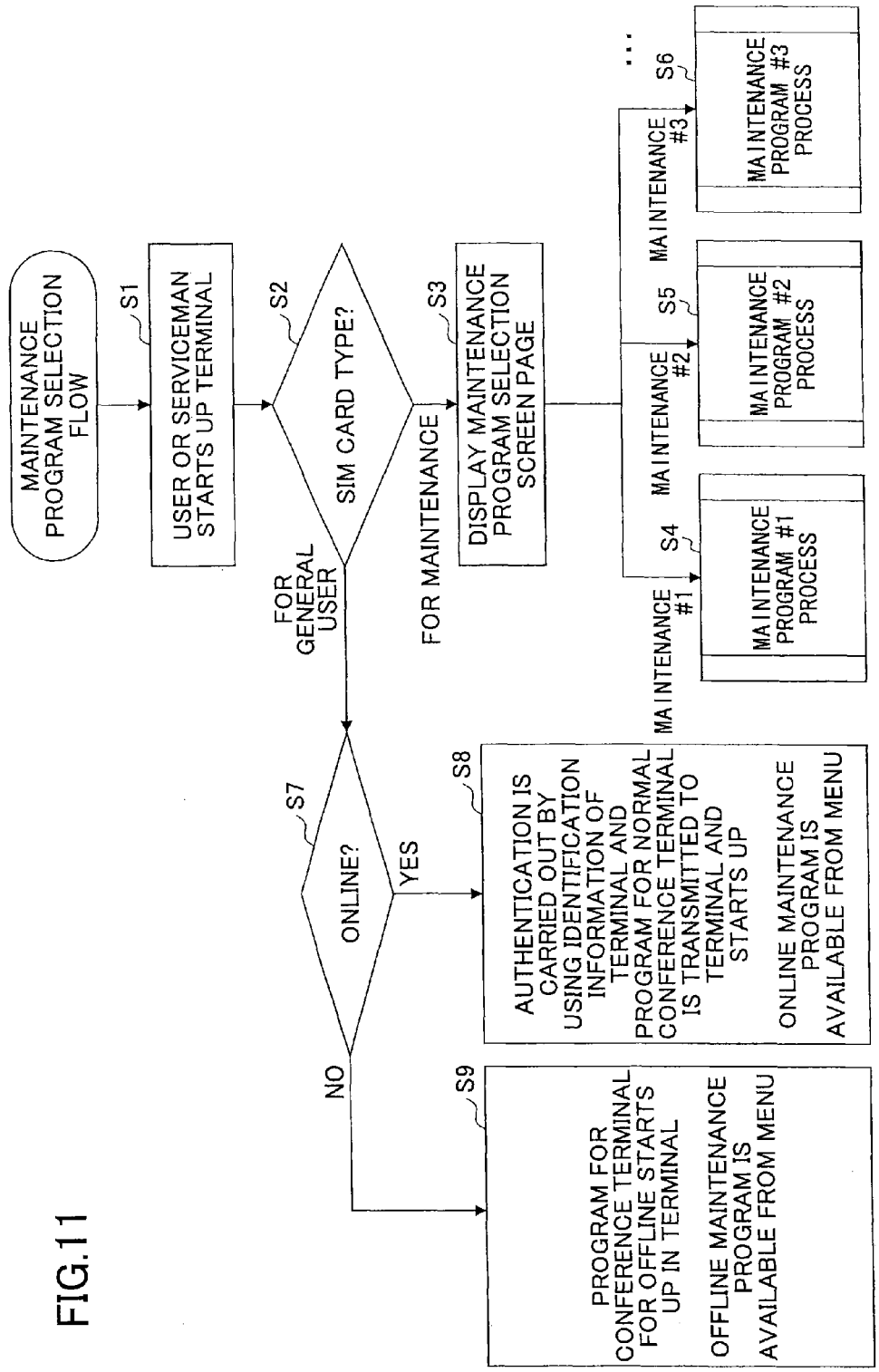
FIG. 11 is a flowchart showing a process example to select a maintenance program.

FIG. 11 is a flowchart showing a process example to select the maintenance program. Note that, below, a case will be described where, as one example of the authentication medium 21, a SIM card 130 is used. However, it is also possible to use an IC card, a SD card, a USB memory or the like as the authentication medium 21.

In FIG. 11, a user or a serviceman starts the transmission terminal 10 (step S1). At this time, a general user inserts a SIM card 130 for a general user into the transmission terminal 10 and starts the transmission terminal 10. On the other hand, a serviceman inserts a SIM card 130 for maintenance into the transmission terminal 10 and starts the transmission terminal 10. As for a method of managing the SIM cards 130 for maintenance, they are strictly managed as a result of, for example, only servicemen who previously obtain permission therefor being allowed to have the SIM cards 130.

The transmission terminal 10 determines the type of the inserted SIM card 130 by using SIM card type information stored in the inserted SIM card 130 (step S2). The SIM card type information includes identification information for determining whether the SIM card 130 is one for a general user or one for maintenance. Note that it is also possible that, when the SIM card type information indicates the type of a maintenance card, the transmission terminal 10 determines it as one for maintenance, whereas, when no SIM card type information is stored in the SIM card 130, the transmission terminal 10 determines it as one for a general user.

When the type of the SIM card 130 is one for maintenance ("FOR MAINTENANCE" in step S2) as a result of the determination in step S2, the transmission terminal 10 displays a maintenance program selection screen page (step S3).

Figure 12:
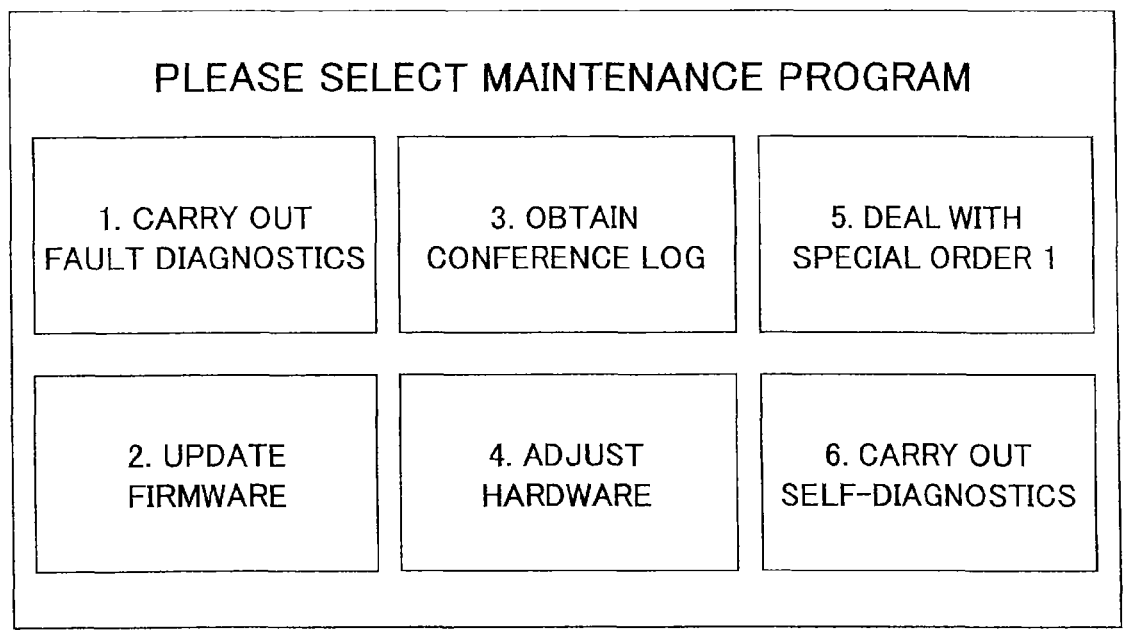
FIG. 12 shows one example of a maintenance program selection screen page.

FIG. 12 shows one example of the maintenance program selection screen page. In the example, 6 types of maintenance programs (functions) can be selected. Functions displayed here can be changed according to the state of connection of the transmission terminal 10 with the communication network 2. For example, a firmware update function having a relatively large size may require a wired LAN environment instead of a wireless LAN environment since a considerable time may be required for downloading it. As for such a firmware update function, it is also possible that the transmission terminal 10 determines whether the currently connected network corresponds to a wired LAN environment and displays the maintenance program selection screen page only when the currently connected network corresponds to a wired LAN environment.

Returning to FIG. 11, when the serviceman selects a maintenance program, a process concerning the selected maintenance program is carried out (steps S4 to S6). Note that the transmission terminal 10 requests the user to input a PIN code corresponding to the maintenance program via a Graphical User Interface (GUI). When a PIN code is input and the PIN code is an authorized one, the corresponding process is then carried out. Details of the process concerning such a maintenance program will be described later.

Further, the "maintenance program" is a program not necessary when a general user uses a remote conference function, and is a program whose operations cannot be guaranteed if a general user operates it, such as a function of updating the firmware or BIOS, a function of obtaining network communication quality concerning communication with the transmission management system 50, a function of changing a non-compatible device to a compatible device, a function of tuning for a specific user or the like.

Usage of these maintenance programs can be limited depending on the skill of a serviceman. For the respective maintenance programs, PIN codes are assigned for allowing the corresponding maintenance program to be used. A method of managing the PIN codes is, for example, such that all the PIN codes are disclosed to a serviceman who is highly skilled in Information Technology (IT) and has received the proper security training. On the other hand, only predetermined PIN codes are disclosed to a serviceman who receives minimal training.

On the other hand, when the type of the SIM card 130 is one for a general user ("FOR GENERAL USER" in step S2) as a result of the determination in step S2, the transmission terminal 10 determines whether the transmission terminal 10 is in an online state capable of being able to connect to the communication network 2 (step S7).

When it is determined that the transmission terminal 10 is in an online state (YES in step S7), the transmission terminal 10 transmits login request information including the identification information and the password of the transmission terminal 10 to the transmission management system 50. In the transmission management system 50, the terminal authentication part 52 authenticates the transmission terminal 10 by using the identification information and the password included in the login information received from the transmission terminal 10 and the information stored in the terminal authentication management DB. Then, when the transmission terminal 10 receives an authentication result indicating that the authentication is successful from the transmission management system 50, it is possible to start a program in a mode to be used by a general user (step S8). That is, a program for a normal conference terminal is transmitted to the transmission terminal 10 and is started. Then, from its menu, the user can use the online maintenance program (usable online) for a general user.

On the other hand, when the transmission terminal 10 is in an offline state of not being able to be connected with the communication network 2 (NO in step S7), a program for a conference terminal for offline is started in the transmission terminal 10. The offline maintenance program (usable offline) for a general user can be used through its menu (step S9). Note that, with the offline maintenance program, in comparison to the online maintenance program, a function that can be used only online, for example, a function of diagnostics to determine whether a network can be connected between the transmission terminal 10 and the relay apparatus 30 cannot be used. Thus, a function that can be used only online cannot be used with the offline maintenance program. Further, in an offline state, the transmission management system 50 cannot authenticate the transmission terminal 10. Therefore, it is possible to provide such a configuration that a function that can be used offline but requires a high security level cannot be used with the offline maintenance program.

In the related art, only a User Interface (UI) or setting information is obtained from a server through authentication, and therewith, an operation setting or a UI of a transmission terminal is changed. However, in this method, a program for a maintenance process itself is stored in the transmission terminal. Therefore, information for maintenance may be found out when an analysis such as disassembling is carried out on a disk or the like that is removed from the transmission terminal. In order to avoid such a situation, the disk or the like should be encrypted.

In contrast thereto, according to the present embodiment, the process program itself is placed in a server (cloud) or is stored in a recording medium (such as a SD card type SIM card or the like) for authentication. Then, when authentication is successful, the maintenance program is transmitted to the transmission terminal and is executed. Thereby, it is possible to provide the maintenance function safely.

In a case where it is not possible to connect with a network, the process program is stored in an "authentication card for maintenance" which requires authentication for executing the stored program. Then, a serviceman uses the "authentication card for maintenance", as an authentication card and also as a maintenance program storage card. Thereby, it is possible to safely provide the maintenance function.

Further, according to the present embodiment, it is possible to provide a plurality of maintenance functions by a single SIM card as a result of different sets of authentication information being stored for the respective functions in the single SIM card and also a program being stored which requests the user to input a corresponding set of authentication information for each of the different services. In other words, it is possible to provide maintenance services to respective servicemen having different skills from a single SIM card.

Figure 13:
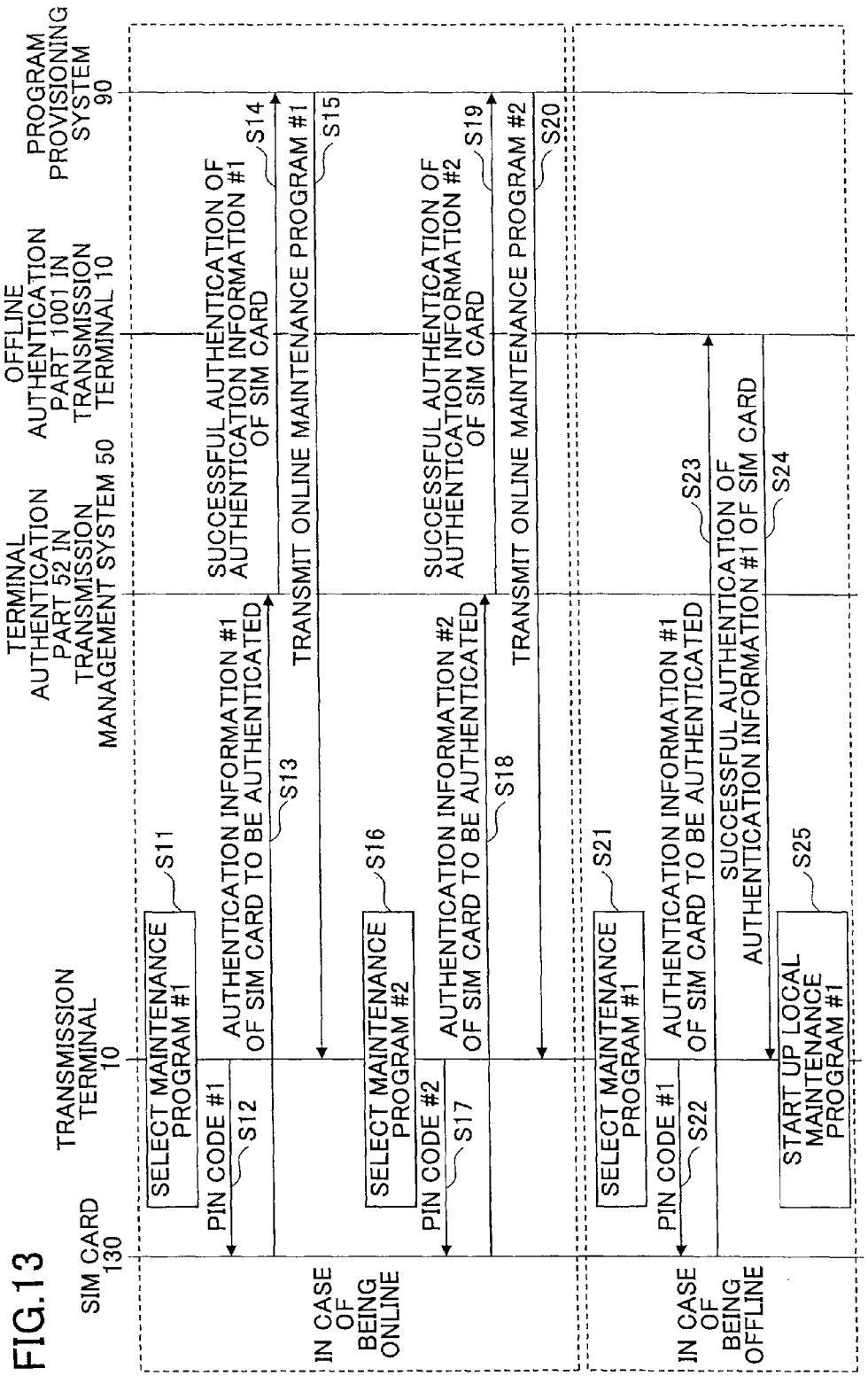
FIG. 13 is a sequence diagram showing an example of an authentication process using a SIM card.

FIG. 13 is a sequence diagram showing an example of an authentication process using a SIM card.

In FIG. 13, in a case of being online, when a serviceman selects, for example, a maintenance program #1 on the transmission terminal 10 (step S11) and inputs a corresponding PIN code #1, the PIN code #1 is provided to the SIM card 130 (step S12).

When the provided PIN code is coincident with a previously set one in the SIM card 130, authentication information #1 in the SIM card 130 including the identification information and the password of the transmission terminal and the program identification information of the maintenance program corresponding to the PIN code is transmitted to the transmission management system 50 (step S13). In the transmission management system 50, the terminal authentication part 52 carries out authentication by determining whether the identification information and the password of the transmission terminal included in the received authentication information #1 are coincident with information in the terminal authentication management DB. When it is determined as being coincident (it is determined that the authentication is successful), a transmission instruction is transmitted to the program provisioning system 90 to transmit the maintenance program corresponding to the program identification information included in the authentication information #1 to the transmission terminal 10 (step S14). Note that the transmission instruction includes not only the program identification information but also the address information (such as an IP address) for determining the place of the transmission terminal 10. The IP address of the transmission terminal 10 can be determined by reading the terminal management DB.

In response thereto, the program provisioning system 90 transmits a maintenance program #1 usable online corresponding to the program identification information to the transmission terminal 10 according to the received address information (step S15).

Next, when the serviceman selects, for example, a maintenance program #2 (step S16) and inputs a corresponding PIN code #2 on the transmission terminal 10, the PIN code #2 is provided to the SIM card 130 (step S17).

When the provided PIN code is coincident with one that is previously set in the SIM card 130, authentication information #2 in the SIM card 130 including the identification information and the password of the transmission terminal and the program identification information of the maintenance program corresponding to the PIN code is transmitted to the transmission management system 50 (step S18). In the transmission management system 50, the terminal authentication part 52 carries out authentication by determining whether the identification information and the password of the transmission terminal included in the received authentication information #2 are coincident with information in the terminal authentication management DB. When it is determined as being coincident (when the authentication is successful), a transmission instruction is transmitted to the program provisioning system 90 to transmit the maintenance program corresponding to the program identification information included in the authentication #2 to the transmission terminal 10 (step S19). Note that, the transmission instruction includes not only the program identification information but also the address information (such as an IP address) for determining the place of the transmission terminal 10. The IP address of the transmission terminal 10 can be determined by reading the terminal management DB.

In response thereto, the program provisioning system 90 transmits a maintenance program #2 corresponding to the program identification information usable online to the transmission terminal 10 based on the received address information (step S20).

On the other hand, in a case of being offline, when the serviceman selects, for example, the maintenance program #1 on the transmission terminal 10 (step S21) and inputs the corresponding PIN code #1, the PIN code #1 is provided to the SIM card 130 (step S22).

When the provided PIN code is coincident with one that is previously set in the SIM card 130, the authentication #1 in the SIM card 130 is transmitted to the offline authentication part 1001 in the transmission terminal 10 (step S23). When authentication in the offline authentication part 1001 is successful, a response indicating that the authentication of the authentication #1 is successful is provided (step S24).

In response thereto, the transmission terminal 10 starts a maintenance program #1 usable offline (step S25).

Figure 14:
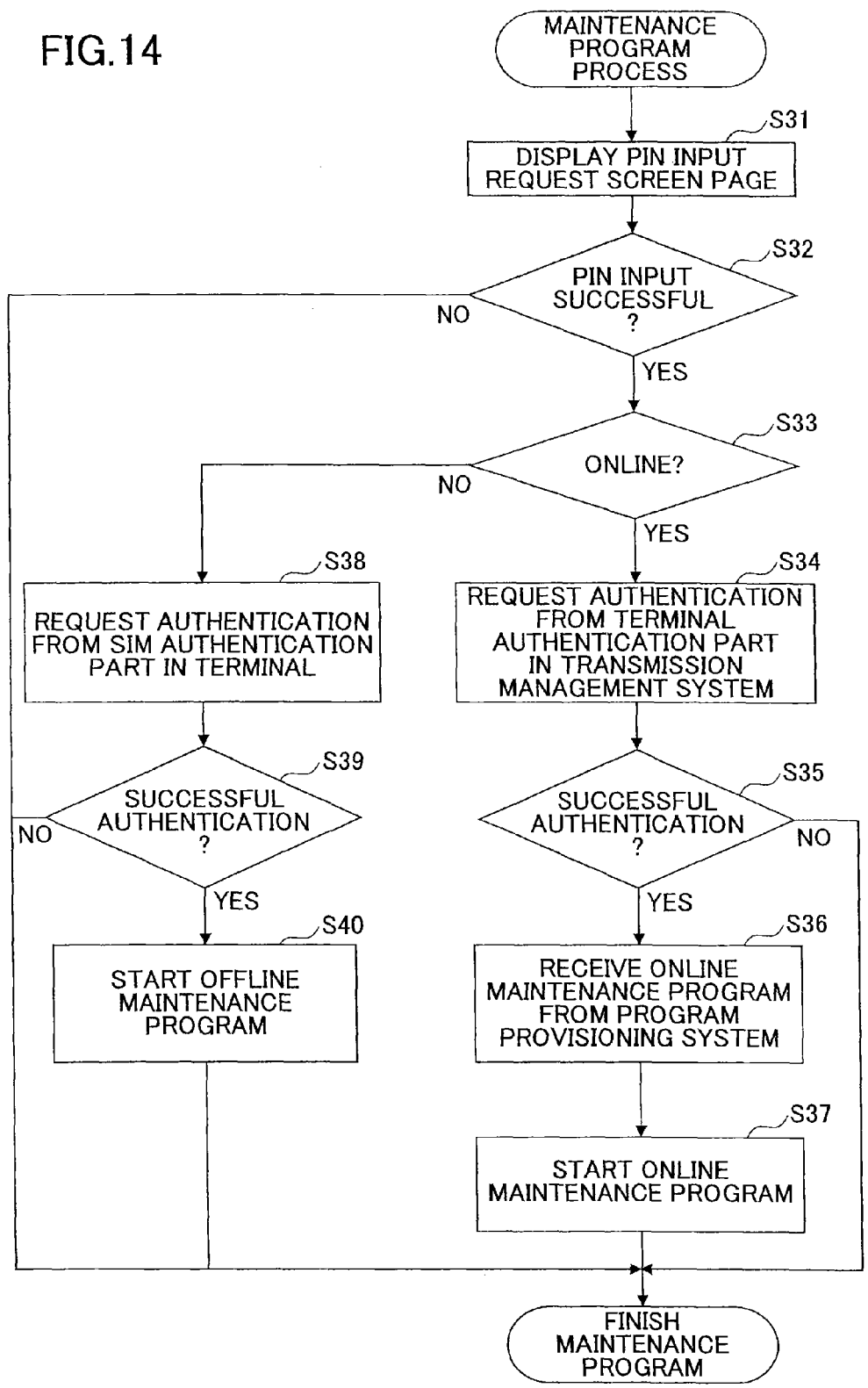
FIG. 14 is a flowchart showing a process example for the maintenance program.

FIG. 14 is a flowchart showing a process example for the maintenance program.

Figure 15:
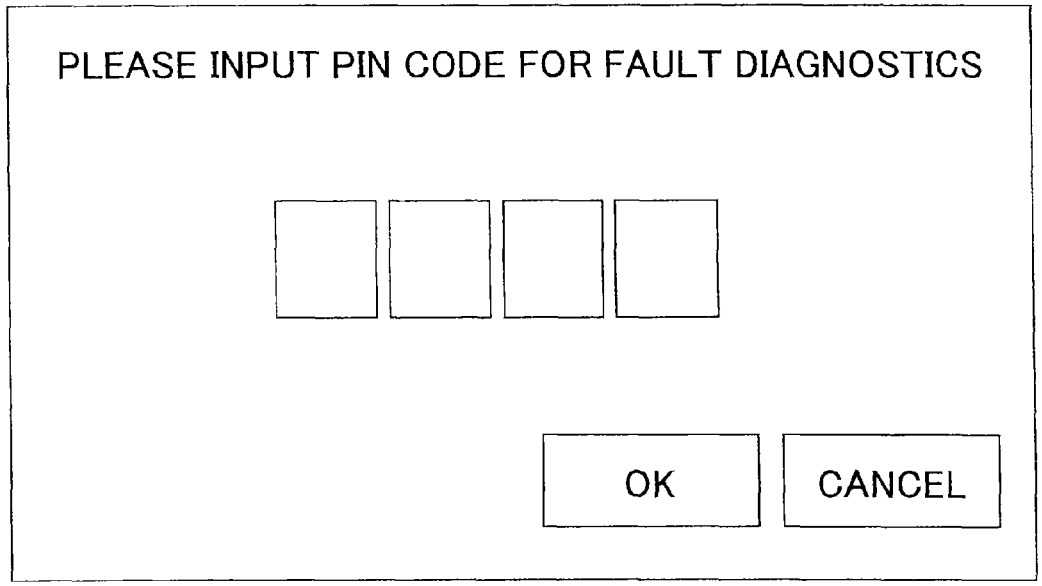
FIG. 15 shows one example of a PIN code input screen page.

In FIG. 14, when the maintenance program is selected and started, the PIN code input screen page corresponding to the selected maintenance program is displayed (step S31). FIG. 15 shows one example of the PIN code input screen page. For example, when a PIN code having four digits is input and an OK button is pressed on the PIN code input screen page, the input is completed.

Note that it is possible that the input of the PIN code is carried out using a keyboard which can be connected to the transmission terminal 10.

Further, the PIN code does not need to be a numeral or characters. Such an input of a numeral or characters using the keyboard requires the keyboard to be carried. On the other hand, a predetermined combination of a plurality of keys of the transmission terminal 10 can be stored as the PIN code. In this case, when a user turns on the power in the transmission while pressing the predetermined combination of the plurality of keys on the transmission terminal 10, the terminal regards this operation as the PIN code of the plurality of keys being input. Then, the transmission terminal 10 compares the thus input PIN code (the predetermined combination of the plurality of keys with a stored PIN code (also a predetermined combination of a plurality of keys). Then, when both are coincident with each other, the transmission terminal 10 cancels the usage restriction of the maintenance program. Alternatively, it is also possible that when a user presses predetermined keys on the transmission terminal 10 in an arbitrary order immediately after selecting the maintenance program, the transmission terminal 10 regards the information of the pressed predetermined keys as the PIN code and determines whether the thus input PIN code is coincident with a stored one in the same way.

Returning to FIG. 14, when the PIN code input is successful (PASS) (YES in step S32), it is determined whether the current state of the transmission terminal 10 is online or offline (step S33). Whether online or offline can be determined based on the network connection state of the transmission terminal 10.

When the transmission terminal 10 is online (YES in step S33), the transmission terminal 10 requests the terminal authentication part 52 in the transmission management system 50 to carry out authentication (step S34). When the authentication is successful (YES in step S35), the transmission terminal 10 receives an online maintenance program (usable online) from the program provisioning system 90 (step S36) and starts the received online maintenance program (step S37).

On the other hand, in a case of being offline (NO in step S33), the offline authentication part 1001 in the transmission terminal 10 is requested to carry out authentication (step S38). When the authentication is successful (YES in step S39), an offline maintenance program (usable offline) is started (step S40).

The offline maintenance program has such a function of being able to be executed at an authentication level less than the online maintenance program. Further, depending on the maintenance program, the program is be finished in a case of being offline while indicating that there is no valid function.

Figure 16:
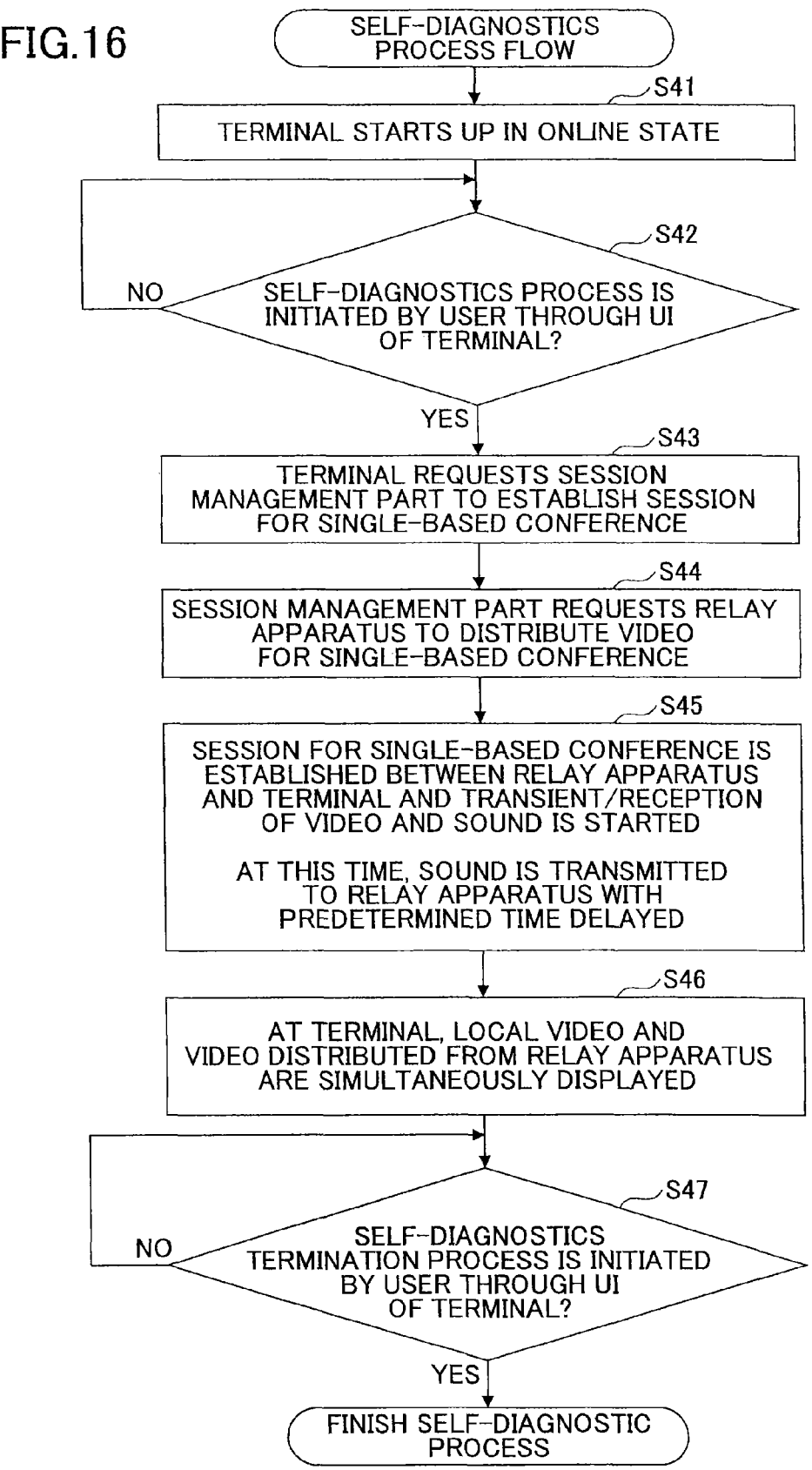
FIG. 16 is a flowchart showing one example a self-diagnostic process according to the maintenance program.

FIG. 16 is a flowchart showing one example a self-diagnostic process according to the maintenance program. Note that this process flow is one example a flow of a process carried out according to a maintenance program and is a flow of a process after the maintenance program is started in the flow shown in FIG. 14. Further, a condition required for executing the maintenance program is that the transmission terminal 10 is started online.

In FIG. 16, when the transmission terminal 10 is started online (step S41), the transmission terminal 10 waits until a user initiates a self-diagnostic process from a menu of a user interface (UI) in the transmission terminal 10 (step S42).

Figure 17:
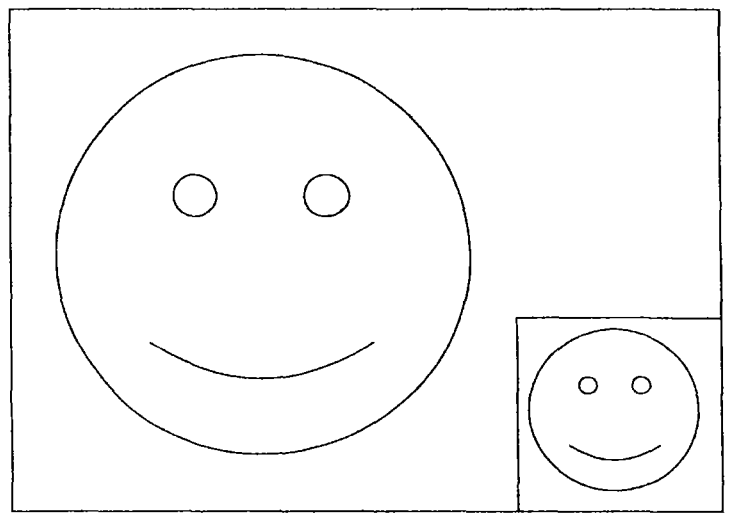
FIG. 17 shows a screen page example at a time of a self-diagnostic process.

When the self-diagnostic process is thus initiated (YES in step S42), the transmission terminal 10 requests the session management part 57 in the transmission management system 50 to establish a session for a single-based conference (step S43). A "single-based conference" means creating a virtual conference room by a single transmission terminal 10 where the transmission terminal 10 connected by a session for a single-based conference has video and sound looped back and thus sent back. FIG. 17 shows a display example on the transmission terminal 10 at this time. In FIG. 17, a local video is displayed in a bottom-right small area and a looped back video is displayed in another large area.

Returning to FIG. 16, the session management part 57 in the transmission management system 50 requests the relay apparatus 30 to distribute a video for the single-based conference (step S44). Thereafter, the session for the single-based conference is established between the relay apparatus 30 and the transmission terminal 10 and transmission and reception of video and sound are started (step S45). At this time, video transmitted from the transmission terminal 10 is looped back and thus sent back in a real-time manner from the relay apparatus 30 while sound is once recorded in the transmission terminal 10 for being able to easily receive diagnostics. Thereafter, the once recorded sound is transmitted to the relay apparatus 30 after being delayed for, for example, around 3 seconds.

The transmission terminal 10 displays the local video (not through the relay apparatus) 30 and the video distributed by the relay apparatus 30 simultaneously. Also, the transmission terminal 10 outputs the sound from the speaker after the sound is input via the microphone and then is looped back from the relay apparatus 30 (step S46). Thereby, it is possible to carry out diagnostics of the functions of the camera, the microphone and the speaker only in the single transmission terminal 10, and also, it is possible to determine whether there is any problem in the network between the transmission terminal 10 and the relay apparatus 30.

Thereafter, when the user initiates a self-diagnostics termination process from the menu of the user interface in the transmission terminal 10 (YES in step S47), the transmission terminal 10 terminates the self-diagnostics.

FIG. 18 is a sequence diagram showing a process example of establishing the session for the self-diagnostic process and looping video and sound back.

In FIG. 18, when the transmission terminal 10 requests the session management part 57 in the transmission management system 50 to establish a session for a single-based conference (step S51), the session management part 57 requests the relay apparatus 30 to starts a single-based conference (step S52) and the relay apparatus 30 notifies the transmission terminal 10 that the session for the single-based conference is established (step S53).

The transmission terminal 10 transmits video and sound to the relay apparatus 30 (step S54), the relay apparatus 30 loops them back and transmits them to the transmission terminal 10 (step S55).

Thereafter, when a disconnection of the session for the single-based conference is requested from the transmission terminal 10 to the session management part 57 in the transmission management system 50 (step S56), the session management part 57 requests the relay apparatus 30 to finish the single-based conference (step S57) and the relay apparatus 30 notifies the transmission terminal 10 that the session for the single-based conference is disconnected (step S58).

Generally speaking, in the related art, loop back is carried out inside a transmission terminal to check video and sound, or a switching unit provided before a switch board is used to carry out self-diagnostics. However, such a function described above according to the present embodiment considering a possible problem that may occur in a transmission route and/or a network band between a video distribution server and a transmission terminal has not been in the related art. According to the present embodiment, it is possible to carry out self-diagnostics also considering a possible influence by a transmission route.

<Summary of the Embodiment>

As described above, according to the present embodiment, concerning maintenance of a transmission terminal (10) included in a transmission system (1) such as a remote conference system, it is possible to provide a function(s) concerning a plurality of maintenance options having different security requirements, respectively, using an authentication medium such as a single SIM card while ensuring safety on security.

Thus, the transmission system, the transmission terminal and the method of transmitting a program have been described in the embodiment. However, the present invention is not limited to the specifically disclosed embodiment and variations and modifications may be made without departing from the scope of the present invention.

[Supplement to the Embodiment]

Note that, each of the relay apparatuses 30, the transmission management system 50, the program provisioning system 90 and the maintenance system 100 according to the embodiment described above can be implemented by a single computer, or can be implemented by a plurality of computers to which the respective parts (functions or the like) thereof are divided and allocated. When the program provisioning system 90 is implemented by a single computer, a program transmitted by the program provisioning system 90 can be transmitted in such a manner that the program is transmitted in a form of a plurality of modules divided from the program or is transmitted without being thus divided. Further, when the program provisioning system 90 is implemented by a plurality of computers, a program can be transmitted from the respective computers in a state where the program is divided into a plurality of modules.

Further, a recording medium or recording media storing the program for the terminal, the program for the relay apparatus, the program for transmission management and the program for the transmission terminal management system, a hard disk(s) storing these programs, and the program provisioning system 90 including the hard disk(s) can be used as program products when the program for the terminal, the program for the relay apparatus, the program for transmission management and the program for the transmission terminal management system are provided to a user(s) in a country or outside of a country.

Further, the present embodiment has been described for a case where the TV conference system is one example of a transmission system 1. However, the present invention is not limited thereto. The present invention can also be applied to a telephone system such as an Internet Protocol (IP) telephony system, an Internet telephony system or the like. Further, the transmission system 1 can be a car navigation system. In this case, for example, one transmission terminal 10 can is used as a car navigation apparatus mounted in a vehicle and another transmission terminal 10 can is used as a management terminal in a management center or a management server which manages the car navigation system, or a car navigation apparatus mounted in another vehicle.

Further, the transmission system 1 can be a communication system for cellar phones/portable phones. In this case, for example, the transmission terminals 10 correspond to cellular phones/portable phones.

Further, the present embodiment has been described where image data and sound data are one example of content data. However, content data is not limited thereto. For example, content data can be tactile data. In this case, a feeling of a user touching one transmission terminal is transmitted to another transmission terminal. Content data can also be smell data. In this case, a smell in one transmission terminal is transmitted to another transmission terminal. Further, content data can be at least one of image data, sound data, tactile data and smell data.

Further, the present embodiment has been described where the transmission system 1 is used for a TV conference. However, the present invention is not limited thereto. For example, the transmission system 1 can also be used for a meeting, a general conversation among family members or friends, or a submission of information unilaterally.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

As mentioned above, the hardware platform includes any desired type of hardware resources including, for example, a central processing unit (CPU), a random access memory (RAM), and a hard disk drive (HDD). The CPU may be implemented by any desired type of any desired number of processor. The RAM may be implemented by any desired type of volatile or non-volatile memory. The HDD may be implemented by any desired type of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-129852, dated Jun. 20, 2013, the entire contents of which are hereby incorporated herein by reference.

PATENT REFERENCE

Patent Reference No. 1: Japanese Laid-Open Patent Application No. 2011-233031
Patent Reference No. 2: Japanese Laid-Open Patent Application No. 2004-303215

What is claimed is:
1. A transmission system comprising:
   a transmission terminal that transmits content data to another transmission terminal via a network;
   a transmission management system that processes a session among a plurality of the transmission terminals or for the single transmission terminal and includes one or more information processing apparatuses; and
   a program providing apparatus that transmits a program to the transmission terminal, wherein
   the transmission terminal includes circuitry that
      requests a user to input execution authentication information when an authentication medium is connected with the transmission terminal, the authentication medium including a storage storing first program identification information identifying a first program and first execution authentication information indicating information requested to be input when the first program is executed in such a manner as to associate the first program identification information with the first execution authentication information, and storing second program identification information identifying a second program different from the first program and second execution authentication information indicating information requested to be input when the second program is executed in such a manner as to associate the second program identification information with the second execution authentication information, determines whether the execution authentication information that is input by the user is coincident with the first execution authentication information or the second execution authentication information stored by the storage, and transmits the first program identification information to the transmission management system when it is determined that the execution authentication information that is input by the user is coincident with the first execution authentication information, and transmits the second program identification information to the transmission management system when it is determined that the execution authentication information that is input by the user is coincident with the second execution authentication information.

the transmission management system includes circuitry that transmits, to the program providing apparatus, a transmission instruction to transmit the first program corresponding to the first program identification information to the transmission terminal, or transmits, to the program providing apparatus, a transmission instruction to transmit the second program corresponding to the second program identification information to the transmission, and the program providing apparatus includes circuitry that transmits the first program corresponding to the first program identification information to the transmission terminal, or transmits the second program corresponding to the second program identification information to the transmission terminal.

2. The transmission system as claimed in claim 1, wherein a PIN code is stored in the authentication medium as the first execution authentication information for the first program identification information, and the transmission terminal transmits the first program identification information to the transmission management system when a PIN code that is input is coincident with the stored PIN code.

3. The transmission system as claimed in claim 1, wherein the first execution authentication information is image information.

4. The transmission system as claimed in claim 2, wherein the circuitry of the transmission terminal regards information concerning keys that is input to the transmission terminal as the PIN code and carries out the determination.

5. The transmission system as claimed in claim 1, wherein the circuitry of the transmission terminal carries out authentication internally at the transmission terminal, when the transmission terminal is not connected with the network.

6. The transmission system as claimed in claim 1, wherein the transmission terminal limits usable functions to be displayed when being connected with a wireless network.

7. A transmission terminal which transmits content data to another transmission terminal via a network, the transmission terminal comprising:

circuitry that requests a user to input execution authentication information when an authentication medium is connected with the transmission terminal, the authentication medium including a storage storing first program identification information identifying a first program and first execution authentication information indicating information requested to be input when the first program is executed in such a manner as to associate the first program identification information with the first execution authentication information, and storing second program identification information identifying a second program different from the first program and second execution authentication information indicating information requested to be input when the second program is executed in such a manner as to associate the second program identification information with the second execution authentication information, determines whether the execution authentication information that is input by the user is coincident with the first execution authentication information or the second execution authentication information stored by the storage, transmits the first program identification information to a transmission management system when it is determined that the execution authentication information that is input by the user is coincident with the first execution authentication information, and transmits the second program identification information to the transmission management system when it is determined that the execution authentication information that is input by the user is coincident with the second execution authentication information.

8. A method of transmitting a program by a transmission terminal which transmits content data to another transmission terminal via a network, the method comprising:

requesting a user to input execution authentication information when an authentication medium is connected with the transmission terminal, the authentication medium including a storage storing first program identification information identifying a first program and first execution authentication information indicating information requested to be input when the first program is executed in such a manner as to associate the first program identification information with the first execution authentication information, and storing second program identification information identifying a second program different from the first program and second execution authentication information indicating information requested to be input when the second program is executed in such a manner as to associate the second program identification information with the second execution authentication information;

determining whether the execution authentication information that is input by the user is coincident with the first execution authentication information or the second execution authentication information stored by the storage; and transmitting the first program identification information to a transmission management system when determining that the execution authentication information that is input by the user is coincident with the first execution authentication information, and transmitting the second program identification information to the transmission management system when determining that the execution authentication information that is input by the user is coincident with the second execution authentication information.

9. The transmission system as claimed in claim 1, wherein the first program and the second program correspond to programs for maintenance.

10. The transmission system as claimed in claim 1, wherein the first program corresponds to a program for fault diagnostics, and the second program corresponds to a program for updating firmware.

* * * * *